United States Patent
Reasoner et al.

(10) Patent No.: US 6,907,314 B2
(45) Date of Patent: Jun. 14, 2005

(54) INVENTORY CONTROL DEVICE

(75) Inventors: Kelly J. Reasoner, Fort Collins, CO (US); Duane L. Harmon, Loveland, CO (US); Robert H. Bohl, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/665,131

(22) Filed: Sep. 16, 2003

(65) Prior Publication Data

US 2005/0060060 A1 Mar. 17, 2005

(51) Int. Cl.[7] ............................................... G06F 7/00
(52) U.S. Cl. ....................................................... 700/214
(58) Field of Search ................................. 700/214, 215; 369/34.01

(56) References Cited

U.S. PATENT DOCUMENTS

| | | | |
|---|---|---|---|
| 4,242,670 A | | 12/1980 | Smith |
| 4,945,429 A | | 7/1990 | Korngiebel et al. |
| 5,059,772 A | | 10/1991 | Younglove |
| 5,546,315 A | * | 8/1996 | Kleinschnitz ............... 700/218 |
| 5,607,275 A | | 3/1997 | Woodruff et al. |
| 5,652,742 A | * | 7/1997 | Baca et al. ............... 369/30.31 |
| 5,740,061 A | | 4/1998 | Dewey et al. |
| 6,023,643 A | * | 2/2000 | Jesionowski ................. 700/214 |
| 6,216,057 B1 | * | 4/2001 | Jesionowski ................. 700/214 |
| 6,286,079 B1 | * | 9/2001 | Basham et al. ............. 711/112 |
| 6,515,946 B1 | * | 2/2003 | Morisaki ................. 369/30.55 |
| 6,741,907 B2 | * | 5/2004 | Chaloner ..................... 700/214 |
| 2002/0138174 A1 | | 9/2002 | Chaloner |
| 2002/0196716 A1 | | 12/2002 | Morisaki |
| 2004/0013051 A1 | | 1/2004 | Ballard et al. |

OTHER PUBLICATIONS

Maetz, A., European Search Report, Application No. EP 04007687, Nov. 18, 2004, 2 pages.

* cited by examiner

Primary Examiner—Khoi H. Tran

(57) ABSTRACT

Inventory control devices and methods for controlling the inventory of a data storage system are disclosed. In one embodiment, the inventory control device comprises a sensor to sense a position of an access device of a data storage system, the access device having an open position and a closed position, a circuit communicatively coupled to the sensor to output a circuit state indicating if the access device was opened while the data storage system was shut down, and control logic communicatively coupled to the circuit to cause the data storage system to inventory one or more storage locations associated with the access device only if the circuit state indicates the access device was opened.

16 Claims, 5 Drawing Sheets

INVENTORY CONTROL DEVICE

BACKGROUND OF THE INVENTION

Data storage systems, such as tape libraries, are used to store and retrieve data storage devices from locations within the data storage system so that data may be written to or read from the data storage device. Typically, the storage systems are used to store magnetic data cartridges. However, other types of data storage devices may be stored in other embodiments of data storage systems.

Since the contents and/or arrangement of the data cartridges may change, most data storage systems include an inventory system that may be used for keeping track of the presence, locations, and identities of the various data cartridges. Access to the data cartridges within the data storage system may be locked when the data storage system is operational. However, if the data storage system is shut down intentionally or unintentionally (e.g., power failure), an operator or other user may gain access to the cartridges. Since data cartridges could have been exchanged, removed, or added while the data storage system was shut down, an inventory of the cartridges must be performed after the system has been restarted. The inventory is time consuming and may not be necessary most of the time.

SUMMARY OF THE INVENTION

In one embodiment, an inventory control device is disclosed. The inventory control device comprises a sensor to sense a position of an access device of a data storage system. The access device has an open position and a closed position. A circuit is communicatively coupled to the sensor and outputs a circuit state indicating if the access device was opened while the data storage system was shut down. The inventory control device also includes control logic communicatively coupled to the circuit. The control logic causes the data storage system to inventory one or more storage locations associated with the access device only if the circuit state indicates the access device was opened.

BRIEF DESCRIPTION OF THE DRAWINGS

Illustrative embodiments of the invention are illustrated in the drawings in which.

DETAILED DESCRIPTION

Figure 1:
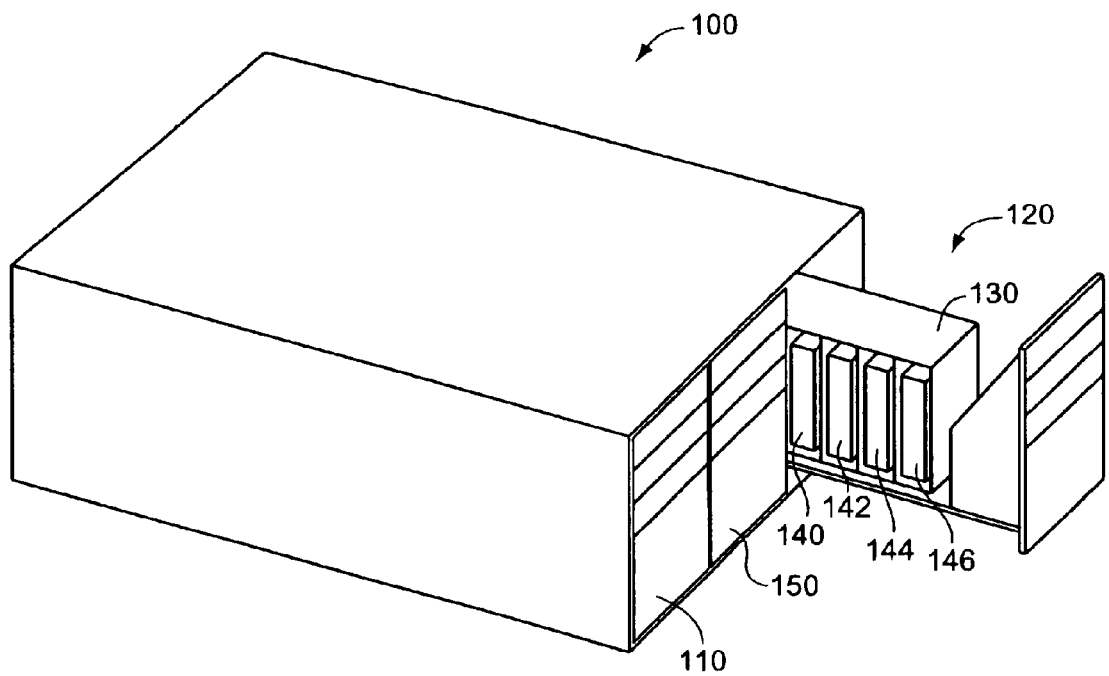
FIG. 1 illustrates a front perspective view of a data storage system including an inventory control device.
Figure 2:
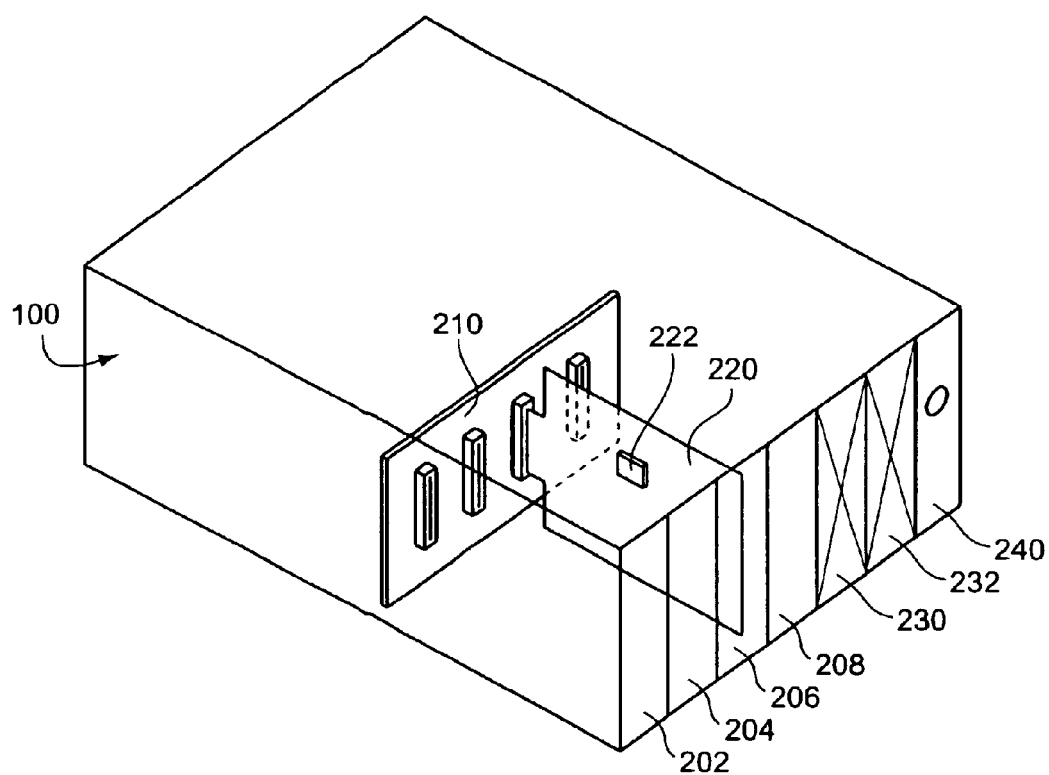
FIG. 2 illustrates a rear perspective view of the data storage system of FIG. 1.
Figure 3:
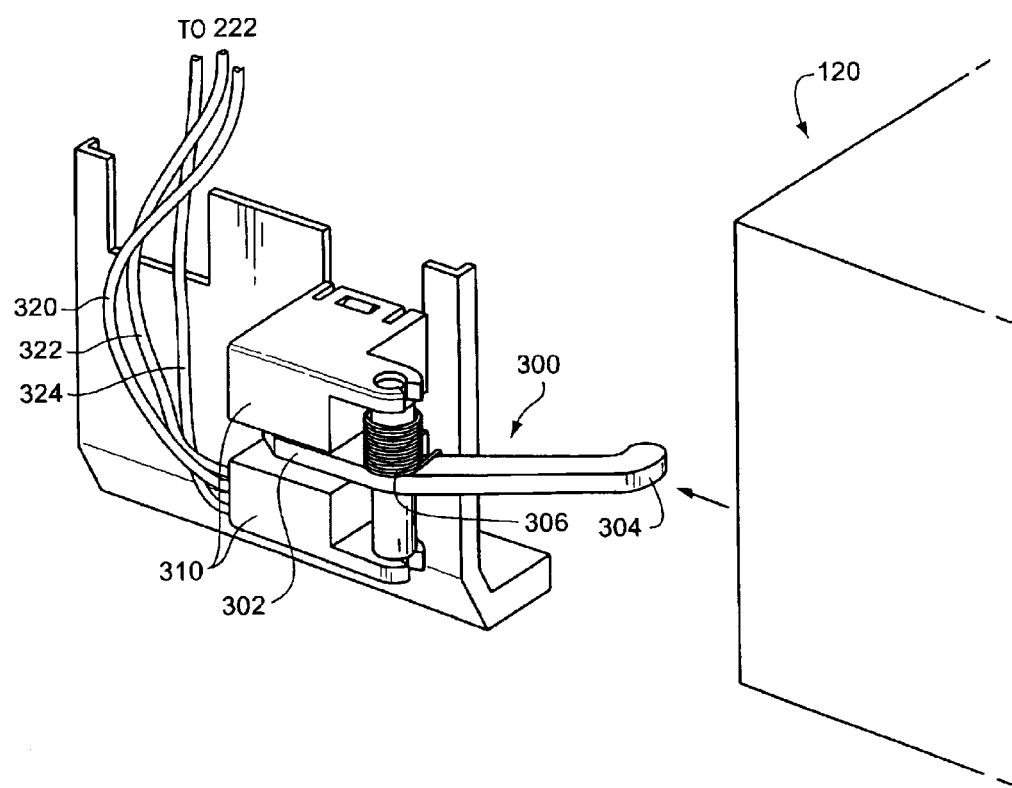
FIG. 3 illustrates a sensor that may be used in the data storage system of FIGS. 1 and 2.

An exemplary data storage system with an inventory control device is illustrated in FIGS. 1–3. By way of example, the data storage system may be a library used to store data cartridges. The data storage system 100 includes a plurality of storage locations to hold data storage devices (e.g., data cartridges) 140–146.

One or more access devices 110, 120 allows users or system operators to gain access to the data storage devices 140–146 associated with an access device 120. As illustrated in FIG. 1, the access device 120 may be a data storage drawer. The data storage drawer may hold a cartridge magazine 130 that includes one or more storage locations to hold data storage devices 140–146. If the data storage drawer is opened, the user has access to data storage devices 140–146 included in the drawer 120, but does not have access to the data storage devices included in drawer 110. It should be appreciated that alternate embodiments may include additional or fewer data storage drawers 110, 120. Additionally, data storage drawers may each include additional cartridge magazines 130 or alternately may use another mechanism to store data storage devices.

Alternative access devices are also contemplated. By way of example, an access device 120 may be a door to a data storage device through which the user may enter and gain access to all of the storage locations within the data storage device. Access devices may also be doors or other mechanisms that allow a user to gain access to a subset or all of the data storage locations within the data storage system 100.

Data storage system 100 also includes a control panel 150. The control panel may be used to display information to a user. It may also be used to hold controls to the library, such as a power or reset button. In alternate embodiments, data storage system 100 may not include control panel 150.

As shown in FIG. 2, the data storage system 100 may also include one or more read/write devices (e.g., tape drives) 230, 232 and a power supply 240. Data storage system may also include a plurality of card slots 202, 204, 206, 208. The card slots may be used to hold circuit cards used to manage and control the data storage system and/or devices within the data storage system 100. One of the slots 206 may hold control logic 220 which may contain circuitry used to control the data storage system 100. By way of example, control logic 220 may be a circuit card connected to a back plane 210. In alternate embodiments, the control logic may be implemented in a different manner than that illustrated in FIG. 2.

Control logic 220 includes a circuit 222 to output a circuit state indicating if the access device was opened. The circuit 222 is communicatively coupled to a sensor 300 that senses the position of access device 120. As shown in FIG. 3, the sensor 300 may be an optical interrupter 310. A pivot 304 is pivotally connected to a flag 302. When access device 120 is closed, it causes the pivot 304 to swing which moves the flag 302 and unblocks the optical interrupter 310. When the access device 120 is opened, a spring 306, biasing mechanism, or other mechanism may cause the pivot to move back to the position shown in FIG. 3 and block the optical interrupter. By using pivot 304, access device 120 may not need to be precisely aligned to change the state of the sensor 300.

The position of the access device is communicated to circuit 222 (e.g., via cable or circuit trace 320). Additional cables or circuit traces 322, 324 may also be included for power and ground. It should be appreciated that alternate embodiments may use a different type of optical sensor 300 to sense the state of access device 120. Alternately, other types of sensors, such as magnetic sensors, may also be used to sense the state of access device 120.

Circuit 222 uses the information obtained from sensor 300 to output a circuit state indicating if the access device 120 was opened while the data storage system 100 was shut down. The data storage system may have been shut down due to a power off, power failure, restart, or other condition that caused the data storage system to be inoperative. Circuit 222 may include trickle voltage from the power supply 240 to power the circuit when the data storage system is turned off or in a standby condition. A battery system may additionally be included with the data storage system 100 to power the circuit 222 and sensor 310 if the data storage system 100 is unplugged. It should be appreciated that control logic 220 may contain additional circuits associated with additional access devices 110 to output circuit states indicating if the associated access device was opened during system shut down. Alternately, the circuit 222 may include logic to determine a circuit state for each access device 110, 120.

Figure 4:
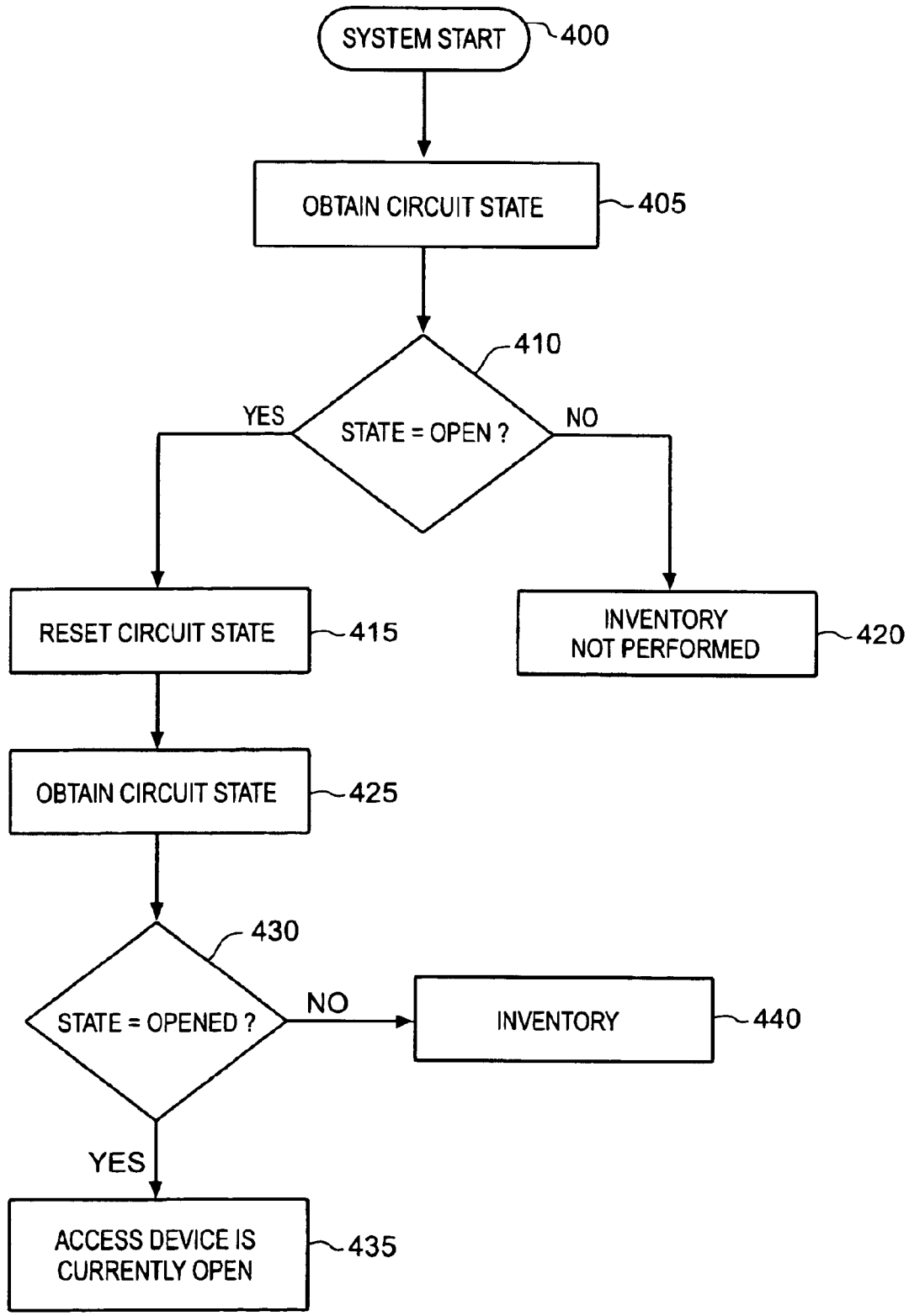
FIG. 4 illustrates a method that may be used to control inventory of the data storage system of FIGS. 1–2 during system start.

As will be explained with reference to FIG. 4, control logic 220 may use the output of circuit 222 and sensor state 320 to determine whether to inventory one or more storage locations associated with access device 120. After the system is started 400, control logic 220 may obtain 405 a state from the circuit 222. The circuit state may comprise an open state and a closed state. If the circuit state is not in an open state 410, the access device 120 was not opened while the data storage system 100 was shut down. Consequently, it is not necessary to inventory the one or more storage locations associated with access device 120 and an inventory on the one or more storage locations is not performed 420.

If the circuit state is in an open state, additional logic may need to be performed to determine if the access device 120 is currently open or was opened and is now closed. This determination may be done be resetting 415 the circuit state and obtaining 425 the circuit state a second time. If the second circuit state is an open state 430, the access device 120 is currently open and an inventory can not yet be performed. Otherwise, the access device 120 is closed but was opened while the data storage system was shutdown. Since users may have rearranged, added, or moved data storage devices within the one or more storage locations associated with the access device, control logic 220 may cause an inventory to be performed 440 on these storage locations. Storage locations associated with access devices that were not opened during system shutdown or that could not have been accessed when the access device 120 was opened during system shutdown may or may not be inventoried. It should be appreciated that in alternate embodiments, the circuit state may include three states (not opened, opened and currently open, and opened and currently closed). In these embodiments, the circuit may not need to be reset to determine whether the access device 120 is currently open and 415–435 may not need to be performed.

In one embodiment, the inventory may be performed by moving a cartridge access device to each of the storage locations that may have been accessed when access device 120 was opened so that the cartridge access device can read bar code labels of the data storage devices contained therein. The inventory list may then be updated with the information obtained from the inventory of the storage locations. Other methods of performing the inventory may also be used.

Figure 5:
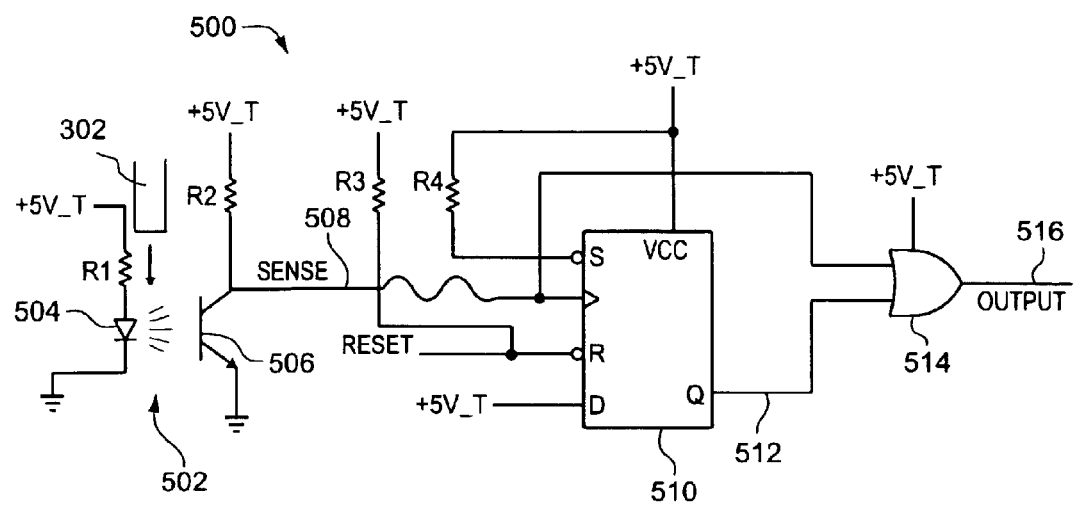
FIG. 5 illustrates an exemplary circuit that may be used in the data storage system of FIGS. 1–2.

FIG. 5 illustrates an exemplary circuit that may be used to control inventory of one or more storage locations associated with access device 120. An optical interrupter 310 comprising a light emitting diode (LED) 504 and a transistor 506 is used to determine the position of the access device 120. Trickle voltage from the power supply is input to the LED 504 through resistor R1. Similarly, trickle voltage is also supplied to the transistor 506 through resistor R2. The trickle voltage may be used to supply power to the optical interrupter 310 while the data storage system 100 is turned off or in a standby condition. In alternate embodiments, power may be additionally or alternately supplied from a battery system to power the circuit when the data storage system 100 is unplugged.

In one embodiment, the output of the sensor 502, SENSE 508, may be high when the access device is open (due to flag 302 breaking the path between LED 504 and transistor 506 so that light does not illuminate the base of transistor 506) and low when the access device is closed (due to flag 302 allowing light to illuminate transistor 506, thereby pulling SENSE 508 to ground). SENSE 508 drives a clock input of a flip-flop 510. SENSE 508 is also an input to an OR logic gate 514 used to output the circuit state 516. The output Q 512 of the flip-flop is used as the second input to the OR logic gate 514.

Trickle voltage is input to flip-flop 510 through resistor R4. In a steady circuit state (e.g., during a power on condition of the data storage device 100), the flip-flop 510 may be reset by pulling the reset input, R, of flip-flop 510 low, thereby causing output Q 512 to output a logic low. The flip-flop may be reset by coupling the reset input, R, to a RESET line which, when pulled low, resets flip-flop 510. Additionally, since the state of the RESET line may not be preserved during a power off condition (or may be subject to glitches during power off and power on), the reset input, R, may also be coupled to a trickle voltage through resistor R3.

In its steady state, with access device 120 closed, SENSE 508 will be low, thereby causing circuit state 516 to be low. Assume now that the access device 120 is opened. In this state, SENSE 508 will be pulled high, and circuit state 516 will rise high, signifying that access device 120 has been opened. The high state of SENSE 508 will also clock flip-flop 510, causing output Q 512 to be pulled high. This high state of Q 512 holds circuit state 516 high after access device 120 is closed. As a result, the combination of SENSE 508 and Q 512 holds circuit state 516 high when 1) access device 120 is opened and remaining open, and 2) access device 120 is opened and then closed.

When the data storage system 100 is restarted (i.e., powered on or rebooted), the circuit state 516 of the circuit is obtained (i.e., read). If the circuit state 516 is low, the access device 120 was not opened and no inventory is performed. If the circuit state 516 is high, the access device 120 was opened while the system was shutdown.

To determine if the access device 120 is still open after restart, the flip-flop 510 is reset by pulling RESET low then high, driving the output Q 512 of flip-flop 510 to be low. As previously mentioned, when the Q 512 is low, the state of SENSE 508 determines the value of circuit state 516. Thus, if access device 120 is closed, SENSE 508 will be low and circuit state 516 will be low, indicating that an inventory of access device 120 may not be performed. However, if access device 120 remains open, SENSE 508 will be high and circuit state 516 will be high, indicating that circuit state 516 will need to be reset and reread once again (most likely after some predetermined wait). It should be appreciated that in alternate embodiments, the circuit 500 may include additional or different components and may include an additional or separate state to indicate that access device 120 was opened but is now closed (i.e., circuit state 516 could have three or more states, possibly carried on two or more output lines).

What is claimed is:

1. An inventory control device comprising:
   a sensor to sense a position of an access device of a data storage system, the access device having an open position and a closed position;

a circuit, communicatively coupled to the sensor, to output a circuit state indicating if the access device was opened while the data storage system was shut down; and control logic, communicatively coupled to the circuit, to i) upon powering of the data storage system, and if the circuit state indicates the access device was opened, determine a current position of the access device by resetting the circuit and re-obtaining the circuit state, and ii) cause the data storage system to inventory one or more storage locations associated with the access device only if the circuit state indicate the access device was opened, but is now closed.

2. The device of claim 1, wherein the access device comprises a data storage drawer.

3. The device of claim 2, wherein the storage locations comprise data cartridge locations within the data storage drawer.

4. The device of claim 1, wherein the sensor comprises an optical interrupter.

5. A method comprising:

obtaining a circuit state from a circuit, the circuit state indicating if an access device of a data storage system was opened while the data storage system was shut down;

upon powering of the data storage system, determining a current position of the access device by obtaining a second circuit state from the circuit; and causing the data storage system to perform an inventory on one or more storage locations associated with the access device if the circuit states indicate the access device was opened, but is now closed.

6. The method of claim 5, wherein determining a current position comprises:

resetting the circuit; and after resetting the circuit, re-obtaining the circuit state from the circuit, the re-obtained circuit state serving as the second circuit state.

7. The method of claim 5, further comprising, if the access device has a current position of open, waiting to perform the inventory until the access device is moved to a closed position.

8. The method of claim 5, wherein the access device comprises a data storage drawer.

9. An inventory control device comprising:

sensing means for sensing the position of an access device means of a data storage system means, the access device means having an open position and a closed position;

circuit means communicatively coupled to the sensing means, the circuit means to output a circuit state indicating if the access device means was opened while the data storage system means was shut down; and logic means communicatively coupled to the circuit means, the logic means to i) upon powering of the data storage system means, and if the circuit state indicates the access device was opened, determine a current position of the access device by resetting the circuit and re-obtaining the circuit state, and ii) cause the data storage system means to inventory one or more storage location means associated with the access device means only if the circuit states indicate the access device means was opened, but is now closed.

10. The device of claim 1, wherein the circuit comprises a single flip-flop to store the circuit state.

11. The device of claim 3, wherein the sensor comprises an optical interrupter, and wherein the circuit comprises a single flip-flop to store the circuit state.

12. The method of claim 5, wherein the circuit state and second circuit state are each obtained from a single flip-flop.

13. The device of claim 9, wherein the access device means comprises a data storage drawer.

14. The device of claim 13, wherein the storage location means comprises data cartridge locations within the data storage drawer.

15. The device of claim 9, wherein the sensing means comprises optical interrupt sensing means.

16. The device of claim 9, wherein the circuit means comprises a single flip-flop to store the circuit state.

* * * * *

UNITED STATES PATENT AND TRADEMARK OFFICE
CERTIFICATE OF CORRECTION

| | |
|---|---|
| PATENT NO. | : 6,907,314 B2 |
| APPLICATION NO. | : 10/665131 |
| DATED | : June 14, 2005 |
| INVENTOR(S) | : Kelly J. Reasoner et al. |

Page 1 of 1

It is certified that error appears in the above-identified patent and that said Letters Patent is hereby corrected as shown below:

In column 5, line 13, in Claim 1, delete "state" and insert -- states --, therefor.

Signed and Sealed this

Fourth Day of August, 2009

JOHN DOLL
*Acting Director of the United States Patent and Trademark Office*